United States Patent [19]

Beall, Jr.

[11] Patent Number: 4,808,302

[45] Date of Patent: Feb. 28, 1989

[54] WATER PURIFIER VALVE

[76] Inventor: Richard W. Beall, Jr., 229 4th Pl., Manhattan Beach, Calif. 90266

[21] Appl. No.: 40,077

[22] Filed: Apr. 20, 1987

[51] Int. Cl.$^4$ .......................... B01D 13/00; C02F 1/44
[52] U.S. Cl. ................................... 210/117; 210/136; 210/257.2; 137/109
[58] Field of Search ............ 210/117, 136, 110, 257.2, 210/433.2, 321.2; 137/109

[56] References Cited

U.S. PATENT DOCUMENTS

| 3,794,173 | 2/1974 | Bray | 210/257.2 |
|---|---|---|---|
| 4,021,343 | 3/1977 | Tyler | 210/257.2 |
| 4,176,063 | 11/1979 | Tyler | 210/257.2 |
| 4,391,712 | 7/1983 | Tyler et al. | 210/257.2 |
| 4,482,456 | 11/1984 | Grayson | 210/257.2 |
| 4,585,554 | 4/1986 | Burrows | 210/257.2 |
| 4,604,194 | 8/1986 | Entingh | 210/257.2 |

Primary Examiner—Benoit Castel
Assistant Examiner—Richard D. Jordan
Attorney, Agent, or Firm—Blakely, Sokoloff, Taylor & Zafman

[57] ABSTRACT

The present invention comprises improvements in the design of a control valve for a reverse osmosis water purifier system that prevents the unstable oscillations and waste water leakage exhibited by control valves of the prior art. To eliminate the unstable oscillations caused in prior art valves by back pressure in the pure water delivery line of the purifier system, the present invention incorporates the improvement of an additional hydraulic passage from the squeeze water outlet of the control valve to the back of the control valve's pilot valve diaphragm. The back pressure maintained on the pilot diaphragm by the squeeze water acts as a dampening force preventing the closure of the pilot valve, and hence the adjacent squeeze valve, as a result of back pressure built up in the pure water delivery line during dispensing. A second improvement consists of changing the interconnection between the control valve's diverter valve, drain, and back pressure area of the pilot diaphragm such that the back pressure on the diaphragm can drain away only when the diverter valve is opened in response to the pressure attained in the pure water delivery line when the spigot is closed. In the prior art valves the drain line was connected directly to the back pressure area of the pilot diaphragm.

In another embodiment of the invention, a piston and matching seat is used to replace the diaphragm of the pilot valve.

7 Claims, 4 Drawing Sheets

WATER PURIFIER VALVE

BACKGROUND OF THE INVENTION

1. Field of the Invention

The present invention relates to the field water purifiers and more specifically to an improved compound valve for controlling the operation of a reverse osmosis water purifying system.

2. Prior Art

U.S. Pat. No. 4,176,063 discloses a control valve for a reverse osmosis water purifying system that controls the operation of the system according to the water pressure present in the system's pure water delivery line. The control valve comprises four individual diaphragm valves linked together by hydaulic passages. The first of these diaphragm valves is a check valve inserted in the pure water delivery line that maintains pressure in the line between the check valve and the spigot when the spigot is closed. The second diaphragm valve is a pilot valve hydraulically linked to the pure water delivery line such that the pilot valve opens when the pure water pressure is low, i.e. when the spigot is open. The third diaphragm valve is a squeeze water valve which opens in response to opening of the pilot valve and controls the flow of pressurized waste water from the reverse osmosis unit to a pure water tank in which the pure water is maintained in a bladder. The pressurized waste water is used to pressurize the pure water to provide adequate pure water delivery pressure when the spigot is open. Finally, the fourth diaphragm valve is an inlet water valve which controls the inflow of water from the main water line to the system. This inlet valve is closed only when the pure water tank is completely filled with pure water.

This prior art control valve has subsequently been improved by the addition of two additional valves. The first of these, a duck bill valve, assures that there is always a limited flow of waste water through the reverse osmosis unit to remove salts and other impurities from the unit's filter membrane whenever water is being filtered. The second, a diverter valve, allows squeeze water from the pure water tank to flow to a drain to eliminate the back pressure in the pure water tank during the filtering process.

Two major problems remain with the operation of the improved prior art valve. The first arises when a long pure water delivery line is used between the valve and spigot or when the system is used to deliver pure water to an automatic ice cube maker. Under these circumstances, when the spigot is opened or the ice cube maker valve is turned on there is initial drop in pressure in the pure water deliver line causing the pilot valve and the squeeze valve to open. However, because of the resistance of the long delivery line or the typically small water valve in the ice cube maker, after this initial drop in water pressure the water pressure in the pure water delivery line rises a certain degree. This pressure causes the pilot valve and squeeze valve to shut shortly after they have been opened. Once the squeeze valve has shut, the pure water pressure drops, and the pilot and squeeze valves once again open. The cycle is repeated, resulting in oscillations in the flow of water and an unpleasant thumping noise in the valve that is transmitted along all the pipes of the system.

A second problem exhibited by the improved prior art valve is leakage of waste water to the drain when the squeeze and pilot valves are open, causing a reduction in the available pure water delivery pressure.

SUMMARY OF THE INVENTION

The present invention comprises improvements in the design of the diverter, squeeze and pilot valves that overcomes the thumping and leakage of the prior art. To eliminate the thumping caused by back pressure in the pure water delivery line, the present invention incorporates the improvement of an additional hydraulic passage from the squeeze water outlet of the valve to the back of the pilot valve diaphragm. The back pressure maintained on the pilot diaphragm by the squeeze water acts as a dampening force preventing the closure of the pilot valve, and hence the squeeze valve, as a result of back pressure built up in the pure water delivery line during dispensing. A second improvement consists of changing the interconnection between the diverter valve, the drain, and the back pressure area of the pilot diaphragm such that the back pressure on the diaphragm can drain away only when the diverter valve is opened in response to the pressure attained in the pure water delivery line when the spigot is closed. In the prior art valves the drain line was connected directly to the back pressure area of the pilot diaphragm.

In another embodiment of the invention, a piston and matching seat is used to replace the diaphragm of the pilot valve.

DETAILED DESCRIPTION OF THE INVENTION

An improved reverse osmosis water purifying system control valve is disclosed. In the following description, for purposes of explanation, numerous details are set forth, such as specific materials, arrangements and proportions in order to provide a thorough understanding of the present invention. However, it will be apparent to one skilled in the art that the invention may be practiced without these specific details. In other instances, well known articles and components, such as diaphragm valves, check valves and reverse osmosis filter membranes have not been described in detail in order not to obscure the present invention unnecessarily.

Figure 1:
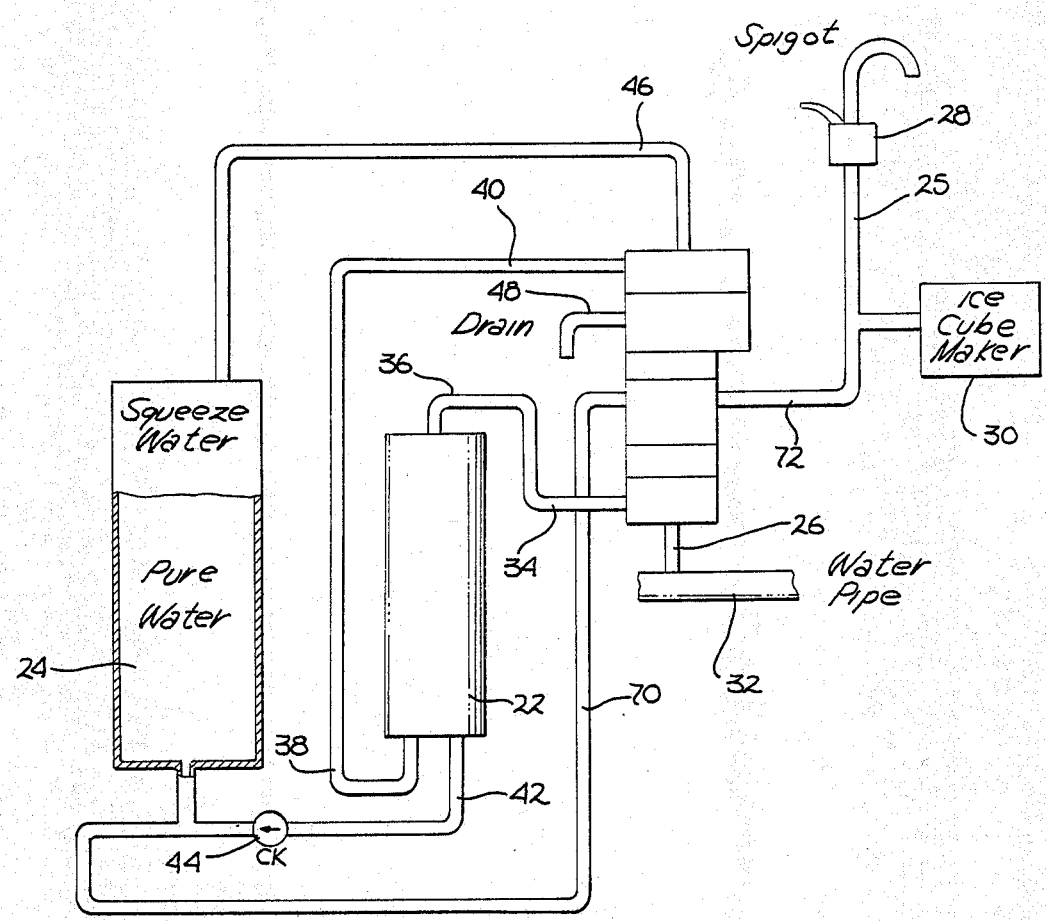
FIG. 1 is a schematic view illustrating the layout of the major components of a typical reverse osmosis water purifying system.

Referring first to FIG. 1, this Figure illustrates the layout of a typical reverse osmosis water purifying system. The major conponents of such a system are a control valve 20, a reverse osmosis unit 22, and a pure water storage tank 24. Unfiltered tap water enters the system through inlet 26 of control valve 20 and pure water is delivered via delivery line 25 to spigot 28 or ice cube maker 30. Although only one spigot and one ice cube maker are shown, it will be understood that the pure water can be delivered to any number of spigots or appliances, such as for instance a coffee maker.

Operation of the system is as follows. Tap water from water pipe 32 enters the control valve 20 through tap water inlet 26 and flows through tap water outlet 34 into reverse osmosis unit 22 through inlet 36. Reverse osmosis unit 22 contains a membrane through which only pure water can pass. A certain proportion of the tap water passes through the membrane and is purified. The remaining tap water, which contains a higher concentration of dissolved salts and other impurities than the original tap water, flows out of the reverse osmosis unit 22 through waste water outlet 38. Waste water outlet 38 is connected to waste water inlet 40 of control valve 20. The purified water exits the reverse osmosis unit through pure water outlet 42 and flows by way of check valve 44 into a flexible bladder contained in pure water storage tank 24. The bladder insures that there is no communication between the squeeze water used to pressurize the pure water and the pure water contained in the bladder. It should be noted that the reverse osmosis process is driven by the pressure difference between the tap water on one side of the membrane and the pure water on the other side. To obtain the maximum yield of pure water, it is important that during the filtering process the pure water is under as little pressure as possible. The pressure exerted by the squeeze water on the pure water is one of the functions that is controlled by the control valve 20. Pressurized waste water from the reverse osmosis unit 22 is allowed to flow from the waste water inlet 40 through the squeeze valve of control valve 20 to squeeze water outlet 46 only at times when the spigot is open and pressure is needed to dispense the pure water contained in pure water storage tank 24. The filtering of the tap water, however, is an ongoing process that continues most of the time, halting only when the pure water tank is completely filled with water. Provision must be made for squeeze water contained in the pure water storage tank to drain out of the system as it is displaced by pure water entering the tank. In addition, a specific flow of waste water must be maintained past the reverse osmosis membrane in order to prevent the build up of salts or other impurities on the membrane. Two additional functions of the control valve 20 are, therefore, to allow squeeze water to drain out of the system at times when the spigot is shut and the pure water tank is not yet full, and to maintain an adequate flow of waste water past the reverse osmosis membrane in order to insure continued efficient operation of the reverse osmosis unit 22.

The operation of the control valve 20 can best be explained with reference to FIG. 1 and the prior art control valve design illustrated in FIG. 2.

Operation of the Prior Art Valve

Figure 2:
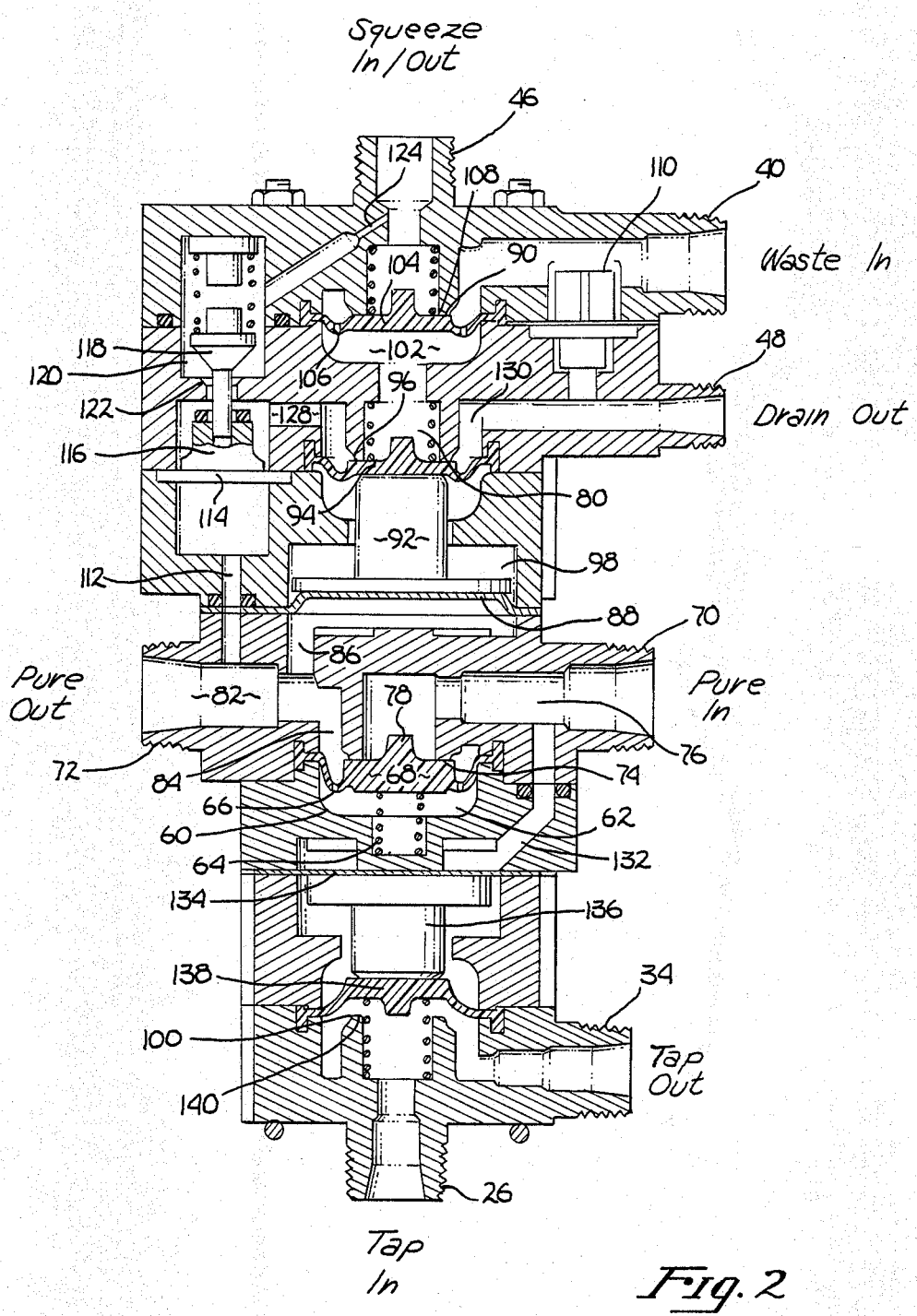
FIG. 2 is a sectional view of a prior art reverse osmosis water purifying system control valve.

The control valve shown in FIG. 2 comprises four diaphragm valves (pure water check valve 60, pilot valve 80, squeeze valve 90, and inlet valve 100), 1 piston valve (diverter valve 120), and duck bill valve 110.

Starting first with the pure water check valve 60, this valve comprises a flexible diaphragm 68, annular valve seat 74, and spring 64. A passage 76 connects pure water inlet 70 to the back 78 of diaphragm 68 (for convention, the side of the diaphragm facing the valve seat will be considered "back" of each of the diaphragm valves regardless of their actual orientation). A second passage 82 connects pure water outlet 72 to annular space 84. When spigot 28 is open and pure water is being dispensed, the pressure of the pure inlet water causes diaphragm 68 to lift from valve seat 74, allowing pure water to flow through check valve 60 and pure water outlet 72 to spigot 28.

When the pressure of the pure outlet water suddenly increases by shutting the spigot 28, a portion of the pressurized pure outlet water flows backwards through orifices 66 contained in the annular portions of diaphragm 68 into space 62 in front of diaphragm 68, causing check valve 60 to close, and trapping pressurized water between check valve 60 and spigot 28. The pressure of the pure outlet water is used to control the operation of pilot valve 80, squeeze valve 90, and diverter valve 120, as explained below.

There are three basic modes of operation of the water purification system:
1. Water purification.
2. Pure water dispensing.
3. Shut down.

Water purification is an ongoing activity that completely stops only when the pure water tank is completely full of pure water. During water purification, control valve 20 has to perform the following functions:
1. Maintain a flow of tap water into reverse osmosis unit 22.
2. Permit draining of squeeze water out of the pure water tank as it is displaced by newly purified water entering the pure water bladder.
3. Maintain a constant limited flow of waste water past the reverse osmosis membrane to flush dissolved salts and impurities out of the system.

Water dispensing occurs whenever the spigot or the ice cube maker inlet valve is opened. During dispensing, the control valve must channel pressurized waste water to pure water tank 24 to act as squeeze water for pressurizing the pure water being dispensed.

Shut down occurs when the pure water storage tank 24 is completely filled with pure water. Control valve 20 must shut down the flow of tap water into the system when the pure water tank is full.

Purification

FIG. 2 illustrates the configuration of control valve 20 of the prior art during purification. Check valve 60 is shut in response to closing of spigot 28. The resultant increase in pressure of the pure water in pure water outlet chamber 82 is communicated by a passage 86 to the underside of diaphragm 88, causing diaphragm 88 to push upwards on piston 92, and causing diaphragm 94 of pilot valve 80 to seal against pilot valve seat 96. Pilot valve diaphragm 94 and diaphragm 88 prevent any flow of water into the space 98 surrounding piston 92. The closure of pilot valve 80 prevents pressurized waste water entering waste water inlet 40 and flowing through orifices 106 in the annular sections of squeeze diaphragm 104 from draining through pilot 80 and out through drain outlet 48. Pressure therefore builds up on the front of squeeze diaphragm 104, causing squeeze diaphragm 104 to seat against squeeze valve seat 108, thereby preventing the flow of waste water from waste water inlet 40 to squeeze water outlet 46.

Pure water outlet chamber 82 is also connected to diverter valve 120 by means of passage 112. The pure outlet water exerts pressure on diverter diaphragm 114, lifting piston 116 and causing tappet 118 to lift from its valve seat 122. The opening of diverter valve 120 allows squeeze water being displaced by pure water in the pure water storage tank 24 to flow through squeeze water outlet 46, restricted passage 124, diverter valve 120, passage 128, and annular pilot valve region 130 out of the system through drain outlet 48. Duck bill valve 110 allows a small quantity of pressurized waste water to flow through the central orifice of duck bill valve 110 to drain outlet 48.

Dispensing

To commence dispensing, spigot 28 is opened, releasing the pressure maintained by check valve 60 in the delivery line 25 between control valve 20 and spigot 28 As a result, the pressure in pure water outlet chamber 82 rapidly drops. This drop in pressure allows water to drain from the underside of diaphragm 88, allowing piston 92 to drop. The dropping of piston 92 in turn allows pilot diaphragm 94 to be lifted from pilot valve seat 96, forming an open passage way from the front of squeeze diaphragm 104 to drain outlet 48. The pressurized waste water contained in space 102 in front of squeeze diaphragm 104 can therefore drain out, allowing diaphragm 104 to lift from valve seat 108 in response to the pressure of pressurized waste water entering through waste water inlet 40. At the same time, water pressure is released from behind diverter diaphragm 114 allowing tappet 118 to drop, thereby closing diverter valve 120.

In the dispensing mode, therefore, pilot valve 80 and squeeze valve 90 are open and diverter valve 120 is shut. Waste water flows through waste water inlet 40 and squeeze valve 90 out of the control valve 20 through squeeze outlet 46, thereby pressurizing the pure water being dispensed from pure water tank 24. A small, controlled, volume of waste water continues to flow out of drain outlet 48 through duck bill valve 110. In addition, some waste water flows through orifices 106 in squeeze diaphragm 104, past open pilot valve 80, and out of drain outlet 48. This leakage of waste water performs no useful function, and is one of the flaws of the prior art valve design.

A second flaw in the prior art valve becomes apparent when the pure water outlet line exhibits a significant amount of resistance to the flow of the pure water. Such resistance may be caused by the length of the delivery line 25 between pure water outlet 72 and spigot 28, or result from the use of a small valve orifice in an ice cube maker or other appliance hooked to the pure water delivery line. Under such conditions, the initial drop in pressure in the pure water outlet chamber 82 caused by the opening of spigot 28 is followed by an increase in pressure as the flowing pure water encounters the resistance of the pure water delivery line. In prior art valves, this increase in pressure, though producing a water pressure lower than the static pressure in pure water outlet 82 when spigot 28 is closed, is sufficient to cause pilot valve 80, and hence squeeze valve 90, to close, cutting off the flow of squeeze water to pure water tank 24. The cutting off of the flow of squeeze water to pure water tank 24 causes a drop in pressure in the pure water flowing through check valve 60 and out of pure water outlet 82. The resulting drop in the flow rate lowers the water pressure in pure water outlet chamber 82 back to a value which allows pilot valve 80 and squeeze 90 to once again open. If the spigot remains open, the whole process is repeated. The result is a rapid cycling of pilot valve 80 and squeeze valve 90 on and off, causing a non-uniform flow of water through spigot 28 and producing vibrations in control valve 20 that are transmitted along the various water lines to the entire water system. These vibrations are not only loud and unpleasant, but can also cause potentional damage to the control valve and other components of the water purification system.

Shut Down

Shut down of the system occurs as follows. A passage 132 connects pure water inlet 76 to the back of diaphragm 134. A piston 136 is disposed betW(R)en diaphragm 134 and inlet valve diaphragm 138. Normally, the tap water inlet pressure entering through tap water inlet 26 is sufficient to lift inlet valve diaphragm 138 from inlet valve seat 140, thereby keeping inlet valve 100 open. When pure water tank 24 is completely filled with water, however, the continued flow of pure water into pure water storage tank 24 causes the pressure of the pure water to increase. Eventually the pressure of the pure water contained in pure water inlet passage 76 is sufficient to overcome the pressure exerted by inlet tap water on the back of inlet diaphragm 138, forcing inlet diaphragm 138 against inlet valve seat 140 and shutting off the flow of tap water into the system.

DESCRIPTION OF THE PREFERRED EMBODIMENTS

Figure 4:
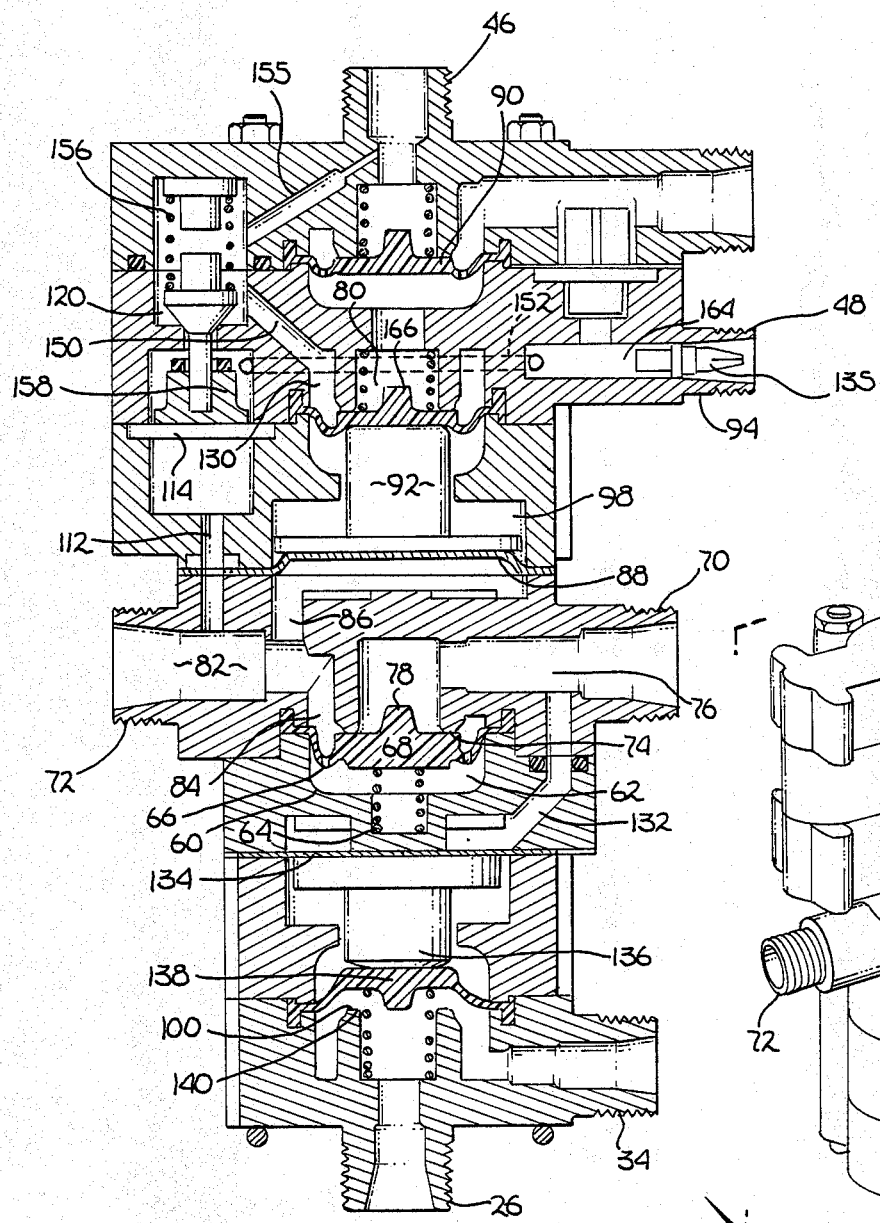
FIG. 4 is a side sectional view of the valve of FIG. 3.
Figure 3:
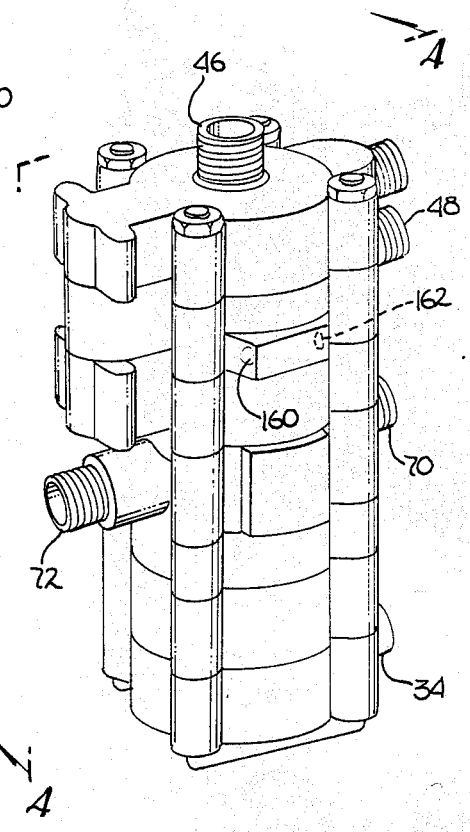
FIG. 3 is an isometric view illustrating the outside appearance of one embodiment of the control valve of the present invention.

The preferred embodiment of the control valve of the present invention is illustrated in FIGS. 3 and 4. Like FIG. 2, FIG. 4 illustrates the configuration of the control valve of the present invention during purification.

Referring to FIG. 4, it can be seen that the structure of the present invention situated below line "A" is identical to to corresponding section of the prior art control valve described above. The description of the components found in this portion of the control valve will therefore not be repeated.

The present invention overcomes the limitations of prior art nozzles through a novel arrangement of passages interconnecting the pilot, squeeze, and diverter valves, drain outlet 48, and squeeze water outlet 46. Drain outlet 48, instead of being directly connected to annular space 130 adjacent to pilot diaphragm 94 as in the prior art, is connected by means of passage 152 to the lower chamber 158 of diverter valve 120. The annular space 130 in turn is connected by passsage 150 to the upper chamber 156 of diverter valve 120. Upper chamber 156 is also connected by passage 155 to squeeze water outlet 46. Annular chamber 130 is therefore directly connected to squeeze water outlet 46 regardless of the state of diverter valve 120. Squeeze water outlet 46 and annular space 130 are connected to drain outlet 48 by means of passage 152 only when diverter valve 120 is open. In the prefered embodiment, passage 152 is formed by drilling two intersecting holes in the side of control valve 20 at the locations indicated by numbers 160 and 162 in FIG. 3. Hole 160 is drilled such that it intersects drain outlet passage 164, and hole 162 is drilled such that it intersects both hole 160 and lower chamber 158 of diverter valve 120. Plugs are then used to seal the ends of holes 160 and 162, thereby forming passage 152.

With the improvements of the present invention, the pilot, squeeze, and diverter valves now function as follows. In the purifying mode, as in the prior art valve, pilot valve 80 and squeeze valve 90 are closed, while diverter valve 120 is opened, all in response to the pressure of the pure outlet water maintained in pure water outlet chamber 82. The open diverter valve allows squeeze water being displaced from pure water tank 24 to drain out of the system through squeeze water outlet 46, passage 155, diverter valve 120, passage 152, and drain outlet 48. During the purifiying mode, therefore, the operation of the present invention is the same as the operation of prior art valves.

It is in the dispensing mode, however, that the improvements of the present invention become evident.

When spigot 28 is turned on, the water pressure in pure water chamber 82 drops, allowing pilot valve 80 and squeeze valve 90 to open as described above. In prior art valves, a rise in pressure in pure water, caused by the resistance of delivery line 25, causes pilot valve 80 and squeeze valve 90 to oscillate open and shut, resulting in undesirable, unstable operation of the control valve. In the present invention, such unstable operation is prevented by connecting annular chamber 130 of pilot valve 80 by means of passages 150 and 155 to squeeze water outlet 46. The pressure of the squeeze water is thereby transmitted to annular space 130. The resulting back pressure exerted on diaphragm 94 prevents pilot valve 80 from closing in response to a minor rise in the pure water outlet pressure caused by flow restrictions contained in water line 25.

The present invention also prevents excessive leaking of waste water through the orifices 106 in squeeze diaphragm 104 during the dispensing mode. In the present invention, waste water flowing through orifices 106 can no longer flow past pilot valve 80 and out drain outlet 48, since drain outlet passage 164 is no longer directly connected to annular space 130 as in the prior art. Leakage of waste water through orifices 106 and drain outlet 148 in the dispensing mode is therefore prevented, insuring that all of the waste water (except for the controlled amount continuing to flow through duck bill 110) is available for use as squeeze water to provide pure water delivery pressure.

The preferred embodiment of the present invention also includes a check valve 135 (preferably a duck-bill check valve) mounted in drain outlet 48. Check valve 135 forms two functions: 1) it prevents water from the drain line from backing up into the water purifier system when the drain line becomes blocked, and 2) it provides a nominal amount of back pressure to insure that drain outlet passage 164 stays filled with water, thereby suppressing any noise caused by the controlled flow of water through duck bill 110 entering drain outlet passage 164. If drain outlet passage is only partially filled with water, which occurs in prior art valves when pilot valve 80 is shut, the noise of the controlled flow through duck bill 110, though not excessive, can be irritating.

Figure 5:
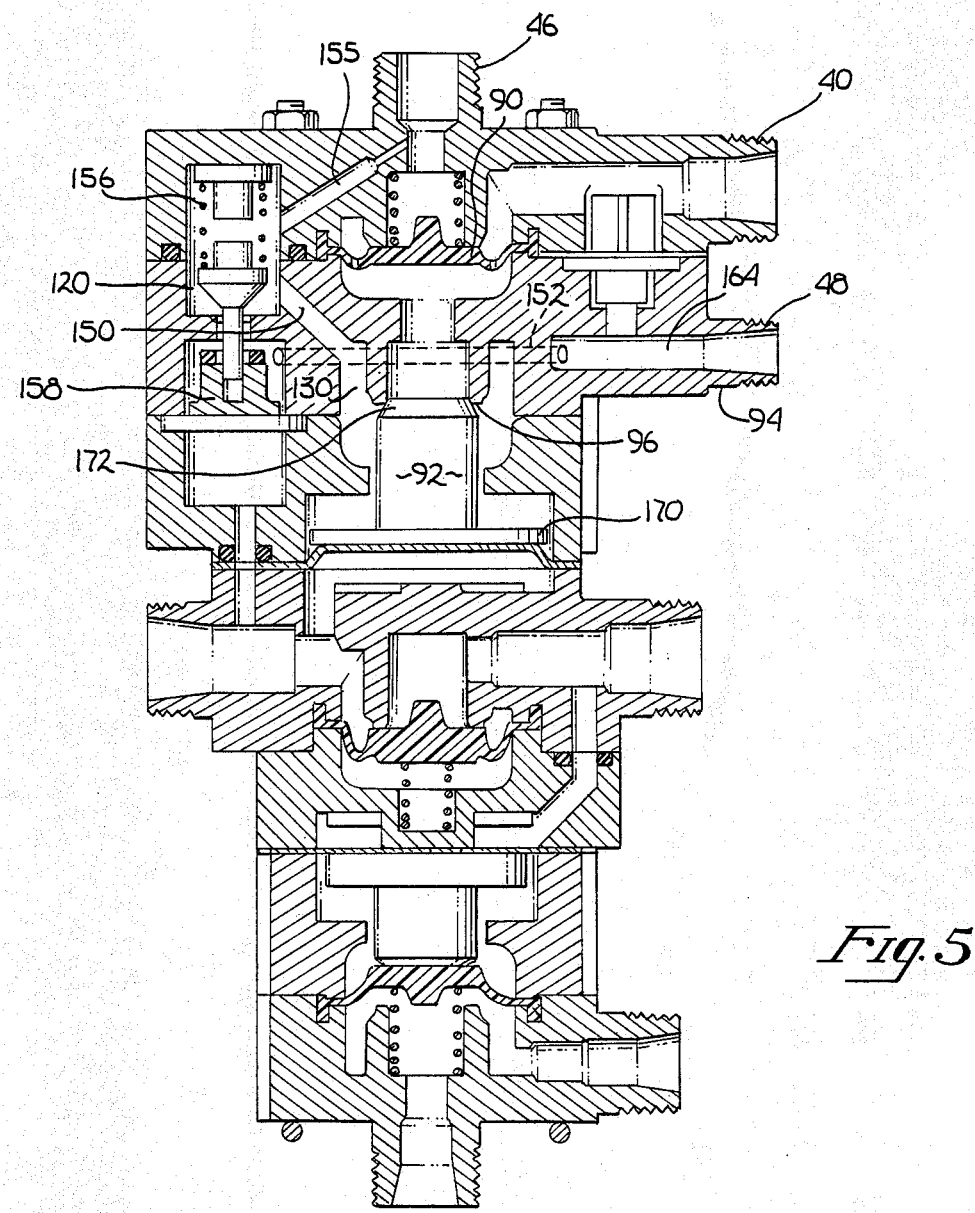
FIG. 5 is a side sectional view of an alternative embodiment of control valve of the present invention.

A second embodiment of the present invention is shown in FIG. 5. In this embodiment, pilot diaphragm 94 has been eliminated from the pilot valve. Instead, piston 92 has been extended and its end 172 tapered such that tapered end 172 seats against pilot valve seat 96 when piston 172 is raised by the pressure of the pure outlet water when the spigot 28 is closed. As in the previous embodiment, squeeze water communicated to pilot valve 80 by means of passages 155 and 150 prevents the unstable closure of pilot valve 80 in response to increases in the pressure of the pure outlet water caused by the resistance of delivery line 25. In this embodiment, the squeeze water pressure acts on the bottom flange 170 of piston 92 instead of on the annular region of pilot diaphragm 94 as in the previous embodiment.

For both embodiments the preferred material for the body of control valve 20 is a thermoplastic, although metals or other materials can be used.

Accordingly, an improved control valve for reverse osmosis water purifications systems has been disclosed. The present invention prevents the unstable operation that occurs in prior art valves when the pure water outlet line of the system exhibits a moderate degree of resistance to the flow of the pure water. The present invention also minimizes the leakage of waste water from the system when the pure water is being dispensed, therefore insuring that the maximum possible pure water delivery pressure is available. Although specific details are described herein, it will be understood that various changes can be made in the materials, details, arrangements and proportions of the various elements of the present invention without departing from the scope of the invention. For example, the spacial placement of the pilot, squeeze, and diverter valves need not be as specifically illustrated as long as the described interconnections are maintained. The diverter valve need not be a tappet valve but a diaphragm valve may also be used. The pilot, squeeze, and diverter valves may be placed above, below, or next to the check valve or inlet valve. The control valve may be installed such that it is oriented in any direction. Preload springs may or may not be incorporated in the diaphragm and tappet valves. Other variations will be apparent to those skilled in the art.

I claim:

1. In a control valve for a reverse osmosis water purifier system, said water purifier system comprising a reverse osmosis water purifier element and a pressure resistant storage tank; said pressure resistant storage tank having a bladder therein dividing said storage tank into two chambers, one chamber within said tank being a pure water chamber, the other chamber of said tank being a squeeze chamber; said reverse osmosis water purifier element having inlet means for pressurized tap water and outlet means for waste water, said control valve comprising;

a check valve means having an inlet connected to said pure water chamber and an outlet connected to a pure water delivery line comprising a shut off valve means, said check valve means maintaining an elevated pressure in said outlet of said check valve means and said pure water delivery line when said shut off valve means is shut off such that a flow of pure water through said pure water delivery is prevented;

a pilot valve means operating in response to the water pressure at said outlet of said check valve means such that said pilot valve opens at a first pressure at said outlet of said check valve means and closes at a second pressure at said outlet of said check valve means, said second pressure being greater than said first pressure;

a squeeze valve having an inlet passage connected to said waste water outlet means of said reverse osmosis water purifier element and an outlet connected to said squeeze chamber of said storage tank;

a diverter valve having an inlet connected by a first passage means to said outlet of said squeeze valve, said diverter valve opening and closing in response to the water pressure at said outlet of said check valve such that said diverter valve opens at approximately said second pressure and closes at approximately said first pressure;

said pilot, squeeze, and diverter valves each comprising a sealing member which seats on a valve seat;

said sealing member of said squeeze valve comprising port means therethrough radially outwardly of said valve seat of said squeeze valve;

said control valve further comprising a second passage means for effecting communication between said squeeze valve, at a side of its sealing member remote from its valve seat and said pilot valve radially - inwardly of and beneath said valve seat of said pilot valve; such that said squeeze valve opens in response to the opening of said pilot valve and closes in response to the closing of said pilot valve; the improvement comprising:

a third passage means for communicating between said outlet of said squeeze valve and said pilot valve means at the same side of said sealing means of said pilot valve means as said pilot valve seat but at a region outwardly of said pilot valve seat, such that the pressure of the water at the outlet of said squeeze valve means biases said pilot valve sealing means away from said pilot valve seat; and a fourth passage means for communicating from an outlet of said diverter valve means to a drain outlet, said drain outlet connected to a drain means, such that when such diverter valve means opens in response to a rise in the pure water pressure at said outlet of said check valve, water can pass from said outlet of said squeeze valve and from said third passage means through said diverter valve means to said drain means;

whereby closure of said squeeze and pilot valves in response to an increase in the presence of said pure water at said outlet of said check valve while pure water is flowing through said delivery line as a result of flow resistance in said delivery line is prevented.

2. The control valve of claim 1 wherein said pilot, check, and squeeze valve means comprise diaphragm valves.

3. The control valve of claim 1 wherein said sealing means of said pilot valve means comprises a piston means having a tapered end, said tapered end sealing against said pilot valve seat.

4. The improved control valve of claim 1 wherein said diverter valve means comprises a tappet valve.

5. The control valve of claim 1 comprised primarily of a thermo plastic.

6. The control valve of claim 1 further comprising a second check valve means disposed between said drain outlet means and said drain means to prevent a reverse flow of water from said drain means into said control valve.

7. The control valve of claim 6 wherein said second check valve means comprises a duck-bill valve.

* * * * *

UNITED STATES PATENT AND TRADEMARK OFFICE
CERTIFICATE OF CORRECTION

PATENT NO. : 4,808,302
DATED     : 02/28/89
INVENTOR(S) : Beall, Jr.

It is certified that error appears in the above-identified patent and that said Letters Patent is hereby corrected as shown below:

| COLUMN | LINE | |
|--------|------|---|
| 06 | 07 | delete "betW ®en" insert --between-- |
| 08 | 48 | insert --line-- after "delivery" |

Signed and Sealed this

Thirty-first Day of October, 1989

Attest:

DONALD J. QUIGG

Attesting Officer

Commissioner of Patents and Trademarks